United States Patent Office 3,478,129
Patented Nov. 11, 1969

3,478,129
STYRENE/1-OLEFIN BLOCK COPOLYMERS
Roland J. Kern, Chesterfield, and Robert J. McManimie, Glendale, Mo., assignors to Monsanto Company, St. Louis, Mo., a corporation of Delaware
Continuation-in-part of application Ser. No. 114,633, June 5, 1961. This application Oct. 7, 1966, Ser. No. 585,107
Int. Cl. C08f 19/04
U.S. Cl. 260—878           6 Claims

ABSTRACT OF THE DISCLOSURE

Block copolymers of styrene and ethylene are prepared by maintaining a continuous presence of one of the reactants in the reaction zone and intermittently adding the second reactant.

---

Figure 1:
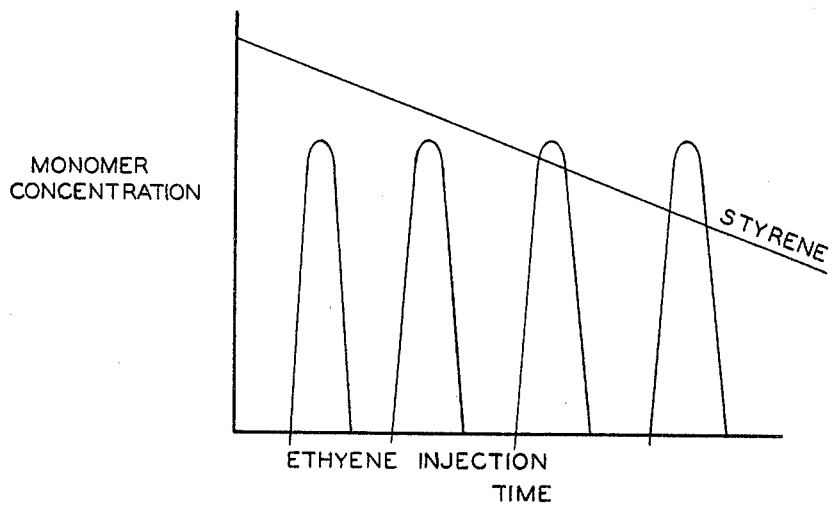

This application is a continuation-in-part of our copending application Ser. No. 114,633, filed June 5, 1961, now abandoned.

The present invention relates to a novel process for the copolymerization of styrene with 1-olefins in the presence of low pressure polymerization catalysts suitable therefor, and to the improved polymers prepared by this invention.

It has heretofore been known that linear polyolefins can be prepared by polymerization of 1-olefins in the presence of low pressure polymerization catalysts, notably the Ziegler polymerization catalysts. Highly linear polystyrene can also be prepared by polymerizing styrene over such catalysts. These linear polymers have defects rendering them unsuitable for many uses, as will be discussed more fully hereinbelow. In general, the present invention combines some measure of the good physical properties of partly crystalline poly 1-olefins and some measure of the desirable physical properties of crystalline tactic polystyrene together into one material.

Previous researchers have attempted to combine the properties of linear poly 1-olefins and tactic polystyrene by simply blending quantities of the two polymers together by mechanical means. These polymer blends are obtained as the result of an extra processing step, e.g., the milling or mixing process, which requires the expenditure of money for additional equipment, mechanical force, heat and power, and, of course labor. Polyblends are unsuitable for many applications due to their adverse solubility or extractability properties when used with various solvent systems, particularly when containing a rubbery, amorphous component.

One aspect of the present invention is directed to a method of controlling the low pressure interpolymerization of styrene and a 1-olefin to prepare block type copolymers. Our novel technique provides for alternately increasing the concentration of at least one monomer constituent of our novel copolymers to substantial amounts and decreasing this monomer concentration to substantially zero as a function of polymerization time.

In one embodiment of the invention, ethylene concentration is varied as described above by feeding ethylene intermittently to a reaction zone. The other monomer, styrene, can be supplied at a constant addition rate or added alternately with the ethylene. The ethylene concentration then drops to zero as it is polymerized or is removed after a period of polymerization by the use of vent or flush periods during which residual ethylene is vented or flushed from the reactor. Pre-set variable sequence timers which control solenoid valves are used to control the length of the periods used in a cycle.

In another embodiment of this invention a linear or cyclic tubular reactor or linearly or cyclicly arranged multiple set of polymerization vessels, suitably interconnected, may be used. In a preferred aspect of our continuous system, we can employ a multi-stage continuous reaction. The ethylene concentration is varied with polymerization time in this embodiment by continuously injecting ethylene or ethylene/styrene mixtures into the continuously flowing polymerization media at suitable locations in the linear or cyclic system and continuously injecting styrene at other suitable locations. The net effect of such a sequence of injection points in a linear or cyclic reactor system can be that an individual polymerization site is carried through zones wherein the ethylene concentration is substantially zero. Thus, the net effect is substantially the same as that achieved by alternating intermittent injection of monomers as described above. Wait periods, vent periods and flush periods can be achieved in this embodiment of the invention by modifications of the simple linear or tubular system obvious to those skilled in the art.

In yet another embodiment of our invention the polymer can be characterized by alternating "blocks" of ethylene/styrene copolymer with blocks of styrene homopolymer of high tacticity. Block polymers are commonly understood to be copolymers consisting of a long sequence of one polymer followed by a long sequence of another polymer. The block polymers resulting from the practice of this invention have a chain of isotactic styrene homopolymer followed by a chain of atactic ethylene/styrene heteropolymer, wherein this pattern can be repeated until the desired molecular weight of the block copolymer is obtained.

The product prepared according to the instant invention has definitely superior properties to the conventional random copolymers prepared by feeding two monomers concurrently, or concomitantly, or by feeding a single stream made up of a monomer mixture to a single polymerization zone. The advantageous properties of the polymer prepared by our invention in the use of alternating intermittent feed cannot be achieved by simply preparing a polyblend from the respective homopolymers. The difference in product quality can be demonstrated by comparing product properties, or by submitting polymer samples to extraction procedures.

The properties of low pressure polyethylene, polypropylene, polybutene-1, polystyrene, etc. are to a considerable extent due to their substantially linear structures and to regular or stereospecific arrangements of side-chain groups (in the case of polypropylene and polystyrene) which permits the polymers to exist in crystalline form. In contrast to this, random 1-olefin/styrene copolymer has an irregular or atactic structure and is substantially amorphous in form. The present invention provides polymers which contain both the tactic homopolymer and atactic copolymer, alternating as "blocks" in the same polymer chains. The presence of copolymer modifies the properties of the homopolymer in certain desirable ways as will be discussed in detail hereinbelow.

In still another embodiment of the invention, the polymer can be characterized by alternating blocks of ethylene/styrene copolymer with blocks of a polyethylene homopolymer. This can be obtained by employing large quantities of ethylene in the polymerization zone with respect to the styrene present. Since the ethylene is the more reactive monomer, it will polymerize more readily than the styrene and hence create large blocks of polyethylene in the copolymer. By periodically reducing the amount of ethylene present in the polymerization zone, blocks of styrene homopolymer of high tacticity will be formed. Accordingly, the product can be then characterized by blocks of styrene homopolymer alternating with blocks of ethylene/styrene copolymer which, in turn, alternates with blocks of polyethylene.

Figure 2:
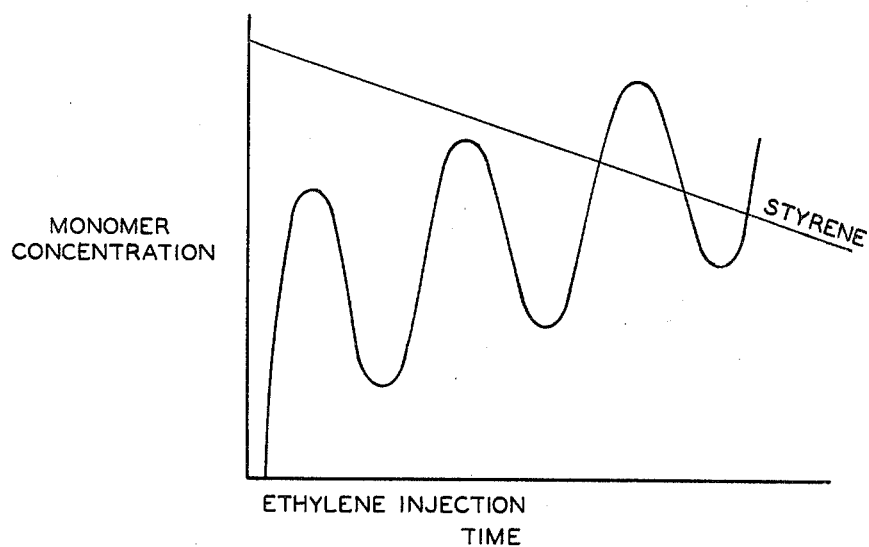

The accompnying drawings, namely FIGURES 1 and 2 are schematic views which illustrate monomer addition conditions, wherein:

FIGURE 1 is a schematic view illustrating a chart showing the monomer concentration as a function of time. As is it polymerized, styrene concentration is reduced over a period of time while ethylene is injected at intervals and completely used up in the polymerization reaction between each of the ethylene injections; and FIGURE 2 is a schematic chart showing monomer concentration as a function of time where the amount of the styrene monomer present in the polymerization zone is also reduced by polymerization, but where the ethylene is injected at intervals so that ethylene is continuously present in the polymerization zone and its average concentration increases with time.

The properties of representative homopolymers of ethylene and propylene produced by the low pressure polymerization process are set forth below:

TABLE I.—PHYSICAL PROPERTIES OF POLYETHYLENE AND OF POLYPROPYLENE PREPARED BY THE LOW PRESSURE PROCESS WITH ZIEGLER-TYPE CATALYSTS

| | Linear Polyethylene | Isotactic Polypropylene |
|---|---|---|
| Density | 0.9494 | 0.9009 |
| Tensile properties: | | |
| Strength, yield (p.s.i.) | 3,772 | 4,920 |
| Strength, break (p.s.i.) | 1,474 | 2,981 |
| Percent Elongation, yield | 15 | 14 |
| Percent Elongation, break | 154 | 319 |
| Impact strength [1] | 0.38 | 0.68 |
| Melt index (190° C.) [2] | 1.8 | 0.98 |
| Clash-Berg modulus data: [3] | | |
| $T_f$ modulus, 135,000 p.s.i. (° C.) | 17.5 | 42 |
| $T_{2,000}$ modulus, 2,000 p.s.i. (° C.) | 124.5 | 158 |
| Stifflex range | 107 | 116 |
| 25° modulus | 105,000 | 205,000 |
| Brittleness temperature (50% failure) | [5] | [6] |
| Stress crack resistance [4] | [7] | [8] |
| Melting point ° C | 135 | 163 |

[1] Determined by the Notched Izod Impact Test, values reported are (ft.-lb./inch notch).
[2] The weight of material in grams which flows out through a hole 0.0825 inch in diameter and 0.315 inch in length, under a load of 2,160 grams, in 10 minutes (ASTM D 1238-52T).
[3] The Clash-Berg modulus data gives information of the torsional stiffness of the polymer as related to temperature. The $T_f$ value is the temperature at which the polymer just begins to have some slight degree of flexibility; and the $T_{2,000}$ is the temperature at which the material becomes very rubbery and non-load bearing. The Stifflex range ($T_{2,000}-T_f$) represents the temperature range over which the polymer is reasonably tough, i.e., high in impact strength, and at the same time rigid enough to bear some load. The value of the 25° modulus is determined to provide a further indication of the torsional modulus at approximately room temperature. The Clash-Berg modulus test has been described by Clash and Berg in Industrial and Engineering Chemistry, Vol. 34, page 1,218 (1942).
[4] The stress crack resistance, known also as environmental cracking is determined by exposing a molded specimen to stress in a poor solvent. In this test, the specimen having a slit, cut by a razor blade, 0.7 inch long and 0.02 inch deep, is immersed under stress in a commercial detergent, marketed by the Irving M. Sobin Co. under the tradename "Hostopol HL," and described as a solution of a non-ionic surface active agent, together with the sodium salt of a sulfonated alkyl aromatic compound. The stressed samples are maintained immersed in the Hostopol HL at 50° C., and the time for a break of the specimen to occur is then recorded. The results are reported as the percentage of specimens cracking within the recorded time.
[5] No break, 75° C.
[6] 15 to 20° C.
[7] 100% failure, 1 day.
[8] No break, 7 days.

The enhancement of product properties over those of polyethylene obtained by the practice of our process is believed to be due, at least in part, to the blocks of crystalline polystyrene along the polymer chains. A comparison of physical properties of highly crystalline, isotacic polystyrene with conventional atactic polystyrene is included in Table II.

TABLE II

| | Crystalline, Isotactic Polystyrene | Conventional, Atactic Polystyrene |
|---|---|---|
| Density | 1.08 | 1.05 |
| Clash-Berg modulus data: | | |
| $T_f$ modulus, 135,000 p.s.i. (° C.) | 99.0 | 89.0 |
| $T_{2,000}$ modulus, 200 p.s.i. (° C.) | 206.0 | 104.0 |
| Stifflex range | 107.0 | 15.0 |
| Impact strength (notched): injection molded | 0.2-0.3 | 0.2-0.3 |
| Tensile properties: | | |
| Strength, break (p.s.i.) | 9,000 | 7,500 |
| Strength, yield (0.2 in./min., (p.s.i.)) D638-52T | 6,000-11,000 | 5,000-9,500 |
| Elongation at break (percent) | 5 | 5 |
| Elongation to break, 0.2 in./min., percent | 0.5-1.5 | 1.0-3.6 |
| Flexural strength, p.s.i. | 18,000 | 17,000 |
| Flexural modulus of elasticity+10⁻⁶ (p.s.i.) impact strength, ¼ x ¼ in. notched bar | 0.4-0.7 | 0.25-0.40 |
| Young's modulus RT. (p.s.i.) | 450,000 | 300,000 |
| Heat distortion temp., ° F | 280 | 180 |
| Brittle temp., ° C | 80 | 80 |
| Zero strength temp., ° C | 200 | 80 |
| Melting point, ° C | 240 | 80-100 |
| Hardness (D676-49T) | 80-90 | 70-80 |

It can be seen from the above data that polyethylene and propylene have good physical properties at room temperature and above but do not have the high temperature properties of crystalline polystyrene. However, it is apparent that the polystyrene is inferior for use at lower temperatures, as indicated by its $T_f$ considerably above room temperature, and similarly by its brittleness temperature which is also at a comparatively high temperature. It can readily be appreciated that it would be advantageous to extend the useful temperature range of polystyrene downward to obtain some of the desirable and useful characteristics of the linear polyethylene, or of the isotatic polypropylene at low temperatures, while still retaining the useful higher temperature properties of crystalline polystyrene. Conversely, the invention can be envisaged as contemplating the extension of the polyethylene, polypropylene, polybutene-1 or other polyalphaolefin temperature range to higher temperatures.

It is an object of the present invention to provide a method of controlling the interpolymerization of ethylene and styrene in the presence of a low-pressure polymerization catalyst in order to obtain polymer product of desired properties. It is a further object of the invention to prepare polymers having a higher $T_{2000}$ temperature and more stress crack resistance than the average Ziegler polyethylene. It is a further object to prepare a polymer having improved and more useful low temperature properties than isotactic polystyrene. It is yet another object of the invention to prepare polymeric products having a broader Stifflex Range than possessed by the average low-pressure process polyethylene, conventional atactic polystyrene, or isotactic polystyrene.

Within the purview of the instant invention we include the preparation of styrene /α-olefin block copolymers. Although we commonly refer to styrene herein, the invention can practiced by the use of a nuclear substituted styrene, e.g., the isomeric vinyl toluenes, the isomeric vinyl ethylbenzenes, and high alkyl toluenes wherein the alkyl radical has from 3 to 12 carbon atoms. Within the scope of this disclosure it will be understood that these substituted styrenes can be used instead of styrene itself.

It is another object of the invention to provide a method of controlling the low-pressure interpolymerization of an alpha-olefin of 2 to 6 carbon atoms and styrene in which the concentration of the alpha-olefin is so regulated that styrene monomer is present at the sole monomer available for polymerization at intervals during the reaction. It is a more specific object to regulate monomer concentrations and control product properties by injecting at least one of the monomers at substantially spaced intervals during the polymerization. This can be achieved by intermittent injection of at least one of the monomers at substantially spaced intervals of time in a single reaction zone or by continuous injection of monomers at suitably spaced locations in a linear or cyclic tubular reactor or linear or cyclic set of suitably interconnected reactors.

It is a still further object to have the alpha-olefin of 2 to 6 carbon atoms, e.g., ethylene monomer, available only for intervals shorter than the average growing polymer chain life of the catalyst employed and preferably much shorter than such chain life, in order to promote polymerization of said scarce monomer as copolymer "blocks" in a homopolymer chain formed from styrene, rather than as a part of a new copolymer chain. The pattern of alternating blocks of atactic copolymer with blocks of crystallizable polystyrene can be achieved by feeding styrene at a rate so that the styrene concentrations in the polymerization zones are substantially above zero. On the other hand, the ethylene monomer concentrations can be varied from a substantial concentration to such a low concentration that essentially all polymer being produced is isotactic polystyrene blocks.

It is another object of the present invention to provide ethylene/styrene copolymer comprising polymer chains which are made up of blocks of isotactic polystyrene homopolymer and blocks of an atactic ethylene/styrene copolymer.

It is an additional object of the present invention to provide an ethylene/styrene copolymer comprising polymer chains which are made up blocks of polyethylene homopolymer and blocks of atactic ethylene/styrene copolymer.

It is a further object of the present invention to provide ethylene/styrene copolymers comprising polymer chains which are made of blocks of isotactic polystyrene homopolymer, blocks of polyethylene and blocks of an atactic ethylene/styrene copolymer.

Another object of this invention is to provide an alpha-olefin/styrene copolymer having polymeric chains consisting of homopolymeric blocks and atactic copolymeric blocks wherein the weight ratio of monomers in the overall polymer is at least 2 to 1, thus, the monomer which is used to build the homopolymer blocks in the polymer chains, i.e., styrene, is used in at least 66.67% by weight, preferably from 75% to 98% by weight, of the total weight of monomer participating in the overall polymeric product. Thus, by using ethylene or ethylene/styrene copolymer blocks to broaden the Stifflex Range of isotactic polystyrene, we prefer to employ styrene to make up at least 75% of the weight of the polymer and 25% or less weight percent of ethylene. For particularly improved polymeric products we prefer to employ feed rates to obtain material containing 80–98 weight percent styrene and 20–2 weight percent ethylene. Products within this composition range are characterized by having a broad Stifflex Range in comparison with 100% styrene polymer. Improved block polymeric products have been obtained containing as much as 92–99.5 weight percent styrene and as little as 8 to 0.5 weight percent ethylene. Conversely, we can use 66.67% of an alpha-olefin of 2 to 6 carbon atoms with up to 33.33% styrene in the preparation of polymers having highly desired physical properties.

As a further embodiment of our invention we can employ the intermittent feeding of styrene to produce the unexpected modification of polyethylene. Advantageously, we prefer to use feed rates which will yield polymer containing at least 75 weight percent ethylene with the balance being styrene. Of particular interest are the polymers, prepared by this invention, containing 85–98 weight percent ethylene and 15–2 weight percent styrene, and polymeric products of 0.5 weight percent styrene with the balance being ethylene have been found to be of interest.

The instant invention can be practiced within a wide range of feed intervals consistent with the reactivity ratios of the comonomers, the average growing chain lifetime of the catalyst sites, monomer concentrations or partial pressures, and temperature. It will be understood that any change in the system which affects these variables will affect the ultimate product properties.

The preferred products prepared according to the instant invention can be characterized by their properties as determined by physical measurements. These block copolymers having at least 2 parts by weight styrene to 1 part by weight ethylene have a Clash-Berg $T_{2000}$ temperatures at least above 110° C., preferably above 120° C., and generally in the range of 115–165° C. and a Clash Berg 25° C. modulus at least about 100,000 p.s.i., preferably above 150,000 p.s.i., and generaally between 150,000 and 300,000 p.s.i.

These block copolymers are further characterized as having a low temperature brittleness temperature lower than 80° C. and preferably between 0 and 50° C. In determining this temperature, test specimens are subjected to a low temperature brittleness test as described in ASTM D–746–55T using the Tinius-Olsen brittleness testing machine. This test measures the temperature at which plastics exhibit brittle failure under impact, when the impact is produced at the temperature specified and using a linear velocity of a striking edge of 6.5 ft. per second. Results of this test are expressed as the temperature at which 50% of the specimens fail.

In some instances it is desirable to submit the block copolymer prepared according to the instant invention to an extraction process using a solvent, e.g., benzene, methyl ethyl ketone or diisopropyl ether. Boiling benzene dissolves any atactic unblocked copolymer or homopolymer prepared concurrently with the block copolymer. Under optimum conditions all of the isotactic homopolymer and all of the atactic copolymer are linked together in blocks along the polymer chain. However, under certain conditions small quantities of atactic copolymer or atactic or stereoblock polystyrene are formed independently. As the production of free atactic copolymer or stereoblock polystyrene increases, the desired improvement in physical properties is not obtained. However, the simple extraction step carried out with boiling methyl ethyl ketone removes essentially all of the unblocked atactic ethylene/styrene copolymer and any atactic or stereoblock polystyrene that may be formed during the polymerization step. After subjecting the product obtained to the extraction step we have found that the physical properties of the block copolymer are improved. Within the scope of this invention, we include, as preferred compositions, the block copolymer which contains less than 5% by weight of material soluble in boiling methyl ethyl ketone. Expressed as the converse, at least 95% of the preferred block copolymer is insoluble in boiling methyl ethyl ketone.

Polystyrene has very poor low temperature brittleness properties which prevent its application in many commercial applications where the material will be subjected to temperatures much below room temperature. The styrene/1-olefin copolymers prepared by uniform feed procedures are necessarily high in atactic polymer content. Although certain copolymers can be prepared that have desirable properties at low temperatures, many of these copolymers have a low modulus value at 25° C. (Clash-Berg test) which precludes their application for industrial uses where torsional strength is required. On the other hand, products prepared according to the instant invention, wherein block copolymers are obtained, have excellent low temperature brittleness properties and high modulus properties at 25° C. Additional product improvement can be obtained by subjecting the block copolymer prepared according to the instant invention to an additional extraction procedure as explained above. It will be understood of course, that variations can be obtained by varying the proportions of styrene to 1-olefin in the copolymer, by varying the ratio of titanium halide to the organo aluminum compound, and by varying polymerization temperature and pressure.

In the practice of our process we can use an alternating intermittent feed of monomers to produce characteristic monomer concentrations, and polymer composition patterns varying with time. Other techniques may be used, such as alternating-intermittent feeds with vent or different gas flush periods, dual or multiple injection points for styrene and 1-olefin in a linear tubular reactor, dual or multiple injection points in a cyclic tubular reactor or in a dual or multiple set of reaction vessels arranged in a linear or cyclic system. In single reactor systems, continuously alternating monomer feeds with or without vent or flush periods may also be used or one feed may be continuous and the other intermittent with or without vent or flush periods.

Certain definitions are set forth herein to better understand the description of our process. A period is defined as an interval of time during which the actions being performed in the system are constant, e.g., ethylene feed period is the period during which ethylene is being fed to the reactor, styrene feed period the period which styrene is being fed to the reactor and a wait, vent or flush period is a period during which the reaction is allowed to proceed without action, is vented or is flushed with a different gas, respectively. The interval of time from the start of a given period to the next start of the same period is defined as a cycle. This terminology is satisfactory for single polymerization zone reactors, but must be modified for linear or cyclic reactors wherein an effect similar to that obtained by the use of alternating intermittent feeds in single polymerization zone reactors is obtained by dual or multiple injection of monomer gases into a catalyst/polymer/media suspension flowing in a linear or cyclic tubular reactor or a linear or cyclic system of batch reactors suitably interconnected. In such examples, periods and cycles are defined not only as intervals of time, but also have a spatial location in the reactor setup.

It is generally desirable that at some time during a given cycle, the concentration of the gas fed intermittently and in minor proportion drop to about zero. This may be accomplished by the use of wait periods, vent periods, or different gas flush periods. It is also desirable that the monomer fed in major proportion be allowed to polymerize in the essential absence of the olefin charged in minor proportion, during some portion of the cycle. A third preferred condition is that the cycle should not exceed the lifetime of a growing chain if a preponderance of block polymer is to be obtained. With these conditions in mind, it is possible to select cycle lengths of 30 seconds or less up to about 35 minutes or more. Preferably, the system is operated to insure that the polymer chains contain about 2 to 5 and upward of 10 blocks of alternating copolymer and homopolymer. The number of blocks along the individual polymer chain is controlled by the cycle length and the lifetime of the individual growing polymer molecule. The latter variable is influenced by temperature, pressure, impurities added, catalyst age, molecular weight distribution control agents such as hydrogen, acetylene and active hydrogen compounds and by the choice of catalyst components and their ratio and concentration. Under suitable conditions, growing chain lifetimes of many hours can be achieved and cycle lengths may be extended for a period of hours or the number of cycles increased. In such cases polymer chains are terminated only by addition of a terminating agent or a transfer agent. Polymers of extreme molecular weight, with a large number of blocks can be thus obtained. In order to adapt these high molecular weight products to a variety of useful materials they can then be degraded to lower molecular weight products in a controlled process. Under other conditions, growing chain lifetimes may be very short and correspondingly short reaction cycles are then necessary for the practice of this invention.

Although we do not intend to be bound or limited to the practice of this invention to theoretical considerations, it is believed that the time for one complete cycle is limited by the time during which a polymer chain at a particular catalyst site continues to lengthen itself. An active site is understood to be a site which will sustain the continued growth of a polymer chain. Radioactive counting studies carried out on catalysts similar to those used for the practice of this invention, to determine growing polymer chain life and the time of the existence of an average active site, indicate that growing polymer chains can have a lifetime of thirty minutes or more. Under favorable conditions growing polymer chains can exist for many hours. Active catalyst sites can exist for much longer periods. To prepare the novel polymers according to one embodiment of our invention, the intermittently-fed second monomer must be added to the polymerization reactor during the lifetime of a growing chain, therefore there must be at least one cycle of monomer feed during the life of the growing chain. In general, the system is operated so as to include at least two cycles per hour, and more preferably at least three cycles per hour.

To prepare the novel polymers according to another embodiment of our invention, the monomer fed in minor proportions can be continuously introduced into a cyclic or linear tubular reactor or suitably interconnected sets of reactors at a number of spatially separated points. The points of injection are determined so that an average catalyst site-growing chain entity passes alternately through zones wherein the concentration of the monomer fed in minor proportion is substantially zero. The flow rate of the catalyst media, the location of the monomer injection points, and the lifetime of a growing chain determine the number of blocks of copolymer that are to be found in the average polymer molecular. We prefer to use conditions that will give at least one block of atactic copolymer and at least one block of isotatic (or linear) homopolymer per molecule.

In one preferred aspect of a continuous system we can employ a multi-stage continuous reaction. With a multi-stage continuous reactor system, we prefer to add at least one polymer block to the growing polymer chain at each stage of the reactor system. When the continuous multi-stage reactor system is employed, the flowing polymerization medium passes from the first stage to the terminal stage in an average time not greater than the lifetime of a growing polymer chain.

In the alternating, intermittent feed embodiment of the invention, the duration of feed for the monomer charged intermittently can be varied from a fraction of a second to 60 seconds, e.g., we can feed this monomer for a fraction of a second every 2 minutes, up to 60 seconds every two minutes in a 30-cycle per hour operation, or this monomer can be fed for a fraction of a second to 600 seconds every 20 minutes. The other monomer may be fed at a constant rate during the polymerization, but this monomer flow is normally interrupted during the intermittent addition of the second monomer. We prefer to feed the monomer, added in minor proportion, for about 5 seconds to about 60 seconds during each 2 minute cycle. The ultimate restriction on the feed rate (duration and number of cycles) is that the weight ratio of monomers in the product polymer be at least 2 to 1.

FIGURES 1 and 2 illustrate the effects of the concentration of each of the polyethylene and styrene monomers in the polymerization zone during a particular time interval. Referring to FIGURE 1, it can be seen that before the first ethylene injection, the only monomer present is styrene. During this time, the product which would be produced in the polymerization zone is polystyrene, which would generally be of an isotatic crystalline form. During the first polyethylene injection, the ethylene/styrene copolymer will be created. In fact, during the entire portion of the time that ethylene is present in the polymerization zone, a copolymer of ethylene/styrene will be created. During the period after the entire amount of ethylene is used up after the first injection and before the second injection of ethylene, pure blocks of polystyrene will again be formed. Similarly, when the second ethylene injection is performed, blocks of ethylene/styrene copolymer are again formed. Likewise during the period after the ethylene has polymerized, between the second and third injections of ethylene, pure polystyrene is again produced. It is to be noted that in this particular condition of reaction, the quantity of styrene monomer present in the polymerization zone is continuously being reduced over a period of time. It is to be noted also that if the same quantity of ethylene was injected at each of the ethylene injections, during the later injections, the proportion of ethylene to styrene will increase until the monomers present consist primarily of ethylene. Ultimately, this will create a condition where almost pure polyethylene is being polymerized due to the fact that ethylene polymerizes much more readily than does the styrene. Under these conditions, the growing chain will also include blocks of polyethylene.

This type of ethylene injection pattern is only one of the patterns which can be employed in the present invention. The ethylene can also be injected along a pattern as more specifically illustrated in FIGURE 2. In this type of ethylene injection, it is to be noted that styrene is also continuously present in a polymerization zone. However, the ethylene is also continuously present. The ethylene is used up more readily than the styrene and injections are needed much more frequently than the styrene which may be continuously added. However, there is always some ethylene present in the polymerization zone. Again, it can be seen that before the ethylene is first injected in the polymerization zone, pure polystyrene is formed. Thereafter, ethylene/styrene copolymer of varying composition is formed. When the concentration of the ethylene is high, an ethylene-rich copolymer is formed. When the ethylene concentration is low, a styrene-rich copolymer will be formed. Again, as the reaction proceeds and the amount of styrene concentration diminishes, almost pure polyethylene blocks will be formed along the chain.

It can be seen that a number of chain types can be created by regulating the time of polyethylene injection and by maintaining the desired quantity of polyethylene present in the polymerization zone. It should also be noted that the polystyrene can either be syndiotactic or isotactic depending upon the type of Ziegler catalyst which is employed. Furthermore, the type of solvent in which the catalyst is dissolved will affect the stereoregularity of the final polymer and the temperature of the reaction will have considerable effect on the stereoregularity of the polymer.

The preparation of the block copolymers of our invention can be conducted in the presence of a polymerization catalyst selected from the material called Ziegler catalysts, materials advanced by Professor-Dr. Karl Ziegler of the Max Planck Institute at Mulheim, Ruhr, Germany. Probably the preferred group of these catalysts is that disclosed in Belgian Patent No. 533,362, issued May 16, 1955 to Ziegler, namely catalysts prepared by the interaction of a trialkyl aluminum with a compound of a metal of Group IV–B, V–B, or VI–B of the Periodic System including thorium and uranium. These and the variety of other catalysts of the Ziegler type, can be considered exemplified by the catalysts obtained by the interaction of a trialkylaluminum with titanium tetrachloride. Instead of or in addition to the aluminum trialkyls, catalysts of the type described in the Belgian patent can be made by reacting the various metal compounds of Groups IV–B, V–B, and VI–B disclosed therein with aluminum compounds of the general formula $RAlX_2$ or $RAlXY$, where R is hydrogen or hydrocarbon, X and Y can be any other substituent including hydrogen or hydrocarbon, particularly dialkyl or diaryl aluminum monohalides, also aluminum hydride, alkyl or aryl aluminum dihydrides, dialkyl or diaryl aluminum hydrides, alkyl or aryl aluminum dihalides, alkyl or aryl aluminum dialkoxy or diaryloxy compounds, dialkyl or diaryl aluminum alkoxy or aryloxy compounds. Similarly, instead of or in addition to the organoaluminum compounds, organic compounds of magnesium or zinc can be used, and these can contain either a single or two hydrocarbon radicals, those of especial interest being Grignard compounds, magnesium dialkyls, mixed organo zinc compounds such as $C_2H_5ZnI$ and zinc dialkyls, all of these, of course, being reacted with compounds of Group IV–B, V–B, or VI–B metals. Another Ziegler-type catalyst is prepared by the interaction of an aluminum compound of the general formula $R_2AlX$, where R is a hydrocarbon radical such as alkyl or aryl, and X is a halogen, with a compound of a metal of Group VIII of the Periodic System, e.g., iron, nickel, cobalt, or platinum, or manganese, for example, dimethylaluminum monobromide plus ferric chloride, diisobutylaluminum chloride plus nickel (trivalent)chloride, diethylaluminum monochloride plus manganic chloride. Another of the classes of Ziegler-type polymerization catalysts comprises compounds of the Groups IV–B, V–B, and VI–B heavy metals, combined with the alkali metal alkyls, for example with lithium-, sodium-, or potassium methyl, -ethyl, -benzyl, -isobutyl, or with complex compounds of such alkali metal alkyls with organic compounds of aluminum, magnesium, or zinc as mentioned above, or complex compounds of alkali metal hydrides with such organic compounds of aluminum, magnesium, or zinc, for example, butyl lithium plus zirconium tetrachloride, sodium tetramethylaluminum plus titanium tetrachloride or plus thorium acetylacetonate. Other Ziegler-type catalysts are prepared by using (in conjunction with compounds of Groups IV–B, V–B, and VI–B metals), instead of trialkylaluminums, triaryl-, triaralkyl-, trialkaryl-, or mixed alkyl- and arylaluminum, zinc magnesium, or alkali metals, e.g., phenyl sodium plus $TiCl_4$.

Those skilled in the art having knowledge of these matters refer to catalysts of the foregoing type as Ziegler or Ziegler-type catalysts; or as Ziegler catalysts adapted for low-pressure polymerization of ethylene or ethylenically unsaturated monomers; and to polymer prepared by their action as Ziegler or Ziegler-type polymers, the terms "Ziegler" and "Ziegler-type" being used synonymously. While the principal classes of such catalysts have been listed, this listing is not to be construed as complete, and various other such catalysts than those set forth may also be used to produce polymers. Thus, ethylene and other monomers can be polymerized by catalysts obtained by treating compounds of heavy metals, especially compounds of the Groups IV–B, V–B and VI–B metals, not with organometallic compounds but rather by reducing agents such as: alkali metals, e.g., lithium, sodium, potassium; alkali hydrides, e.g., lithium hydride, sodium hydride; complex alkali aluminum and alkali boron hydrides, e.g., lithium aluminum hydride; complexes of alkali metal hydrides with boron triaryls or boric acid esters of boronic acid esters; and especially titanium and zirconium halides reduced by zinc or alkaline earth metals or other earth metals including the rare earths, or hydrides of same; said reductions being effected in the complete absence of oxygen, moisture and compounds containing active hydrogen atoms as determined by the Zerewitinoff method. Attention is further directed to the teaching of various of the foregoing catalysts in Ziegler's Belgian Patents 534,792 and 534,888. Still another disclosure incorporated herein by reference is that of Belgian Patent 538,782, issued jointly to Montecatini Societa Generale per L'Industria Mineraris E Chimica Anonima and Professor—Dr. Karl Ziegler, disclosing the polymerization of olefins having at least 3 carbon atoms in the molecule, and their copolymerization with each other and with ethylene, using a variety of Ziegler catalysts; olefins, especially alpha-olefins, disclosed in said Belgian Patent 538,728 include propylene, butylene, isobutylene, pentylene, hexylene, vinyl cyclohexane, and styrene. Catalysts of the said Belgian Patent 538,782, are obtained by reaction of compounds of metals of the left-hand column of the 4th to 6th groups of the periodic table of elements, including thorium and uranium, with metals, alloys, metal hydrides or metal-organic compounds of metals at the 1st to 3rd groups of the periodic table. Yet another disclosure incorporated herein by reference is that of Ziegler's Australian patent application 13,453/55, opened to public inspection May 10, 1956, directed to polymerizing ethylene with catalysts comprising mixtures of organic compounds of the metals of Groups I to III of the Periodic System of the general formula $R_nMeX$, wherein R represents a hydrocarbon radical; X, a hydrocarbon radical or halogen; and Me, a metal of Groups I to III of the Periodic System; and $n$, an integer which is less by one than the valency of the metal Me, with compounds of the metals of Group VIII of the Periodic System or manganese.

A portion of the Ziegler catalysts can be defined as catalyst comprising mixtures of metals or metal compounds of the 1st to 3rd groups of the periodic chart of the elements with compounds of metals of the 4th to 6th groups (including thorium and uranium) of the said periodic chart.

Another group of valuable Ziegler catalysts can be defined as mixtures of organic compounds of metals selected from the group consisting of $R_nMeX$ in which R is hydrocarbon; Me is a 1st to 3rd group metal; X is hydrogen, hydrocarbon or halogen; and $n$ is a number which is lower by one than the valence of the metal Me, with a salt of a Group IV–B to VI–B metal. The molar proportion of the organic metal compound is ordinarily sufficient to reduce the valence of the Group IV–B to VI–B metal at least in part.

Ziegler catalysts can also be defined as including all polyvalent metal compounds in combination with reducing agents, particularly organometals, which are effective to reduce the valence of the polyvalent metal; or as compositions containing polyvalent metals in a valence state lower than their maxmum state and adapted for the low-pressure polymerization of ethylene, and ethylenically unsaturated olefins.

The preparation of the block copolymers according to our invention can be conducted in the presence of a polymerization catalyst comprising a pre-reduced or activated titanium halide and an organo aluminum compound of the formula RAlXY where R is an aryl or alkyl hydrocarbon radical, X is a halogen selected from the group consisting of chlorine, bromine, and iodine, and Y is selected from the group consisting of alkyl radicals, aryl radicals, hydrogen, alkoxy radicals, and aryloxy radicals. Particularly, suitable organo aluminum compounds include the dialkyl aluminum monohalides.

Another polymerization catalyst can be prepared by the interaction of (a) a titanium tetrahalide pre-reduced to a composition containing a major proportion of titanium trihalide, e.g., $Ti_3AlCl_{12}$, with (b) an aluminum compound of the general formula RAlXY, wherein R is an alkyl radical of from 2 to 8 carbon atoms, X is a halogen radical, and Y is selected from the group consisting of hydrogen and alkyl radicals of from 2 to 8 carbon atoms.

The pre-reduced or activated titanium halide is conveniently prepared by the interaction of a titanium tetrahalide, e.g., titanium tetrachloride, titanium tetrabromide, titanium tetraiodide, with a reducing agent prior to the mixing of the two essential catalyst components. Suitable reducing agents that can be used to reduce or activate the titanium tetrahalide include aluminum metal, hydrogen, the alkali metals, e.g., lithium, sodium, potassium; alkali hydrides e.g., lithium hydride, sodium hydride; complex alkali aluminum and alkali boron hydrides, e.g., lithium aluminum hydride, complexes of alkali metal hydrides with boron triaryls, or boronic acid esters, zinc or alkaline earth metals or other earth metals including the rare earths, or hydrides of same; aluminum alkyls, dialkyl aluminum halides, monoalkyl aluminum dihalides, alkyl aluminum sequihalides; said reductions being effected in the complete absence of oxygen, moisture and compounds containing active hydrogen atoms. The reduction or activation of the titanium tetrahalide results in the production of a titanium halide wherein the titanium, exists in a valence state lower than its maximum state.

The resulting polymetal polymerization catalyst is believed to act as a heterogeneous catalyst, i.e., at least some of the product obtained by the interaction of the materials in question is present in solid form, although often in such finely divided form as to be of colloidal or sub-colloidal particle size.

In the practice of this invention, it is sometimes desirable to control the molecular weight or density of the polymeric product by the addition of a catalyst modifier, e.g., we can use a reactive organic oxygen compound as described in copending application, Ser. No. 695,153, a thiophenol as described in copending application, Ser. No. 609,798, water as described in copending application, Ser. No. 736,976, or acetylene.

The overall polymerization catalyst can be prepared in the vessel in which the catalyzed reaction is to be carried out, or can be prepared in one vessel and then transferred to the intended polymerization vessel, and in either event, can either be used immediately after preparation or after a period of time elapses between the preparation of the catalyst and its subsequent use to catalyze the polymerization reaction. If the catalyst is to be used after such a period of time, it is apt to lose activity during the storage period and/or produce polymer of an increased molecular weight as compared with that produced with fresh catalyst. These disadvantages can be minimized by storing the catalyst at a temperature below about 10° C. and preferably below −25° C. for fairly long storage periods, as disclosed and claimed in copending application, Ser. No. 586,352. The preferred catalyst compositions for use in the practice of the instant invention are often conveniently prepared at room temperature; however, they can be prepared at higher temperatures or lower temperatures. Certain advantages are obtained by this practice, including uniform catalyst activity over the course of a reaction period and more effective removal of catalyst residue.

Preferred catalysts are prepared by the interaction of (a) a tetrahalide of titanium with (b) an aluminum compound of the general formula RAlXY, wherein R is an alkyl, cycloalkyl or aryl radical, X is a halide radical, hydrogen, an alkyl, cycloalkyl or aryl radical, and Y is selected from the group consisting of hydrogen, alkyl, cycloalkyl, aryl, alkoxy, or aryloxy radicals. As the organo aluminum compound suitable for use as an essential catalyst component we have found that the trialkylaluminums, dialkyl aluminum monochlorides or a combination of the two are especially preferred. The alkyl radical in these compounds contains from 2 to 8 carbon atoms. By way of example, but not limitation, the following compounds are particularly preferred: diethyl aluminum chloride, triethylaluminum, tripropylaluminum, dipropyl aluminum chloride, diisobutyl aluminum hydride, trihexylaluminum, and dihexyl aluminum bromide. It is to be understood that mixtures of the foregoing types of aluminum compounds can be employed.

The mole ratio of aluminum compound to titanium compound or stated another way, the mole ratio of aluminum to titanium can vary over a wide range, suitable values being from 0.1:1 to 15:1 on up to 20:1 or higher. It is generally preferred to use an Al:Ti mole ratio between 0.1:1 and 10:1, more preferably between 2.5:1 and 4:1.

While active catalysts can be prepared by a variety of procedures, the simplest and perhaps most effective is to add the pre-reduced titanium halide to the organo aluminum halide compound, or vice versa, in the presence or absence of an inert organic solvent. If used, such solvents can suitable be saturated aliphatic and alicyclic and aromatic hydrocarbons, halogenated hydrocarbons and saturated ethers. The hydrocarbon solvents are generally preferred. By way of example, can be mentioned liquified ethane, propane, isobutane, n-butane, n-hexane, the various isomeric hexanes, isooctane, cyclohexane, methylcyclopentane, dimethylcyclohexane, dodecane, industrial solvents composed of saturated and/or aromatic hydrocarbons, such as kerosenes, naphthas, etc. especially when hydrogenated to remove any olefinic compounds, and especially those ranging in boiling point up to 600° F.; and also benzene, toluene, ethylbenzene, cumene, Decalin, ethylene dichloride, chlorobenzene, o-dichlorobenzene are suitable.

If the proportion of solvent is kept low in the reaction mixture, such as from 0 to 0.5 part by weight inert organic solvent per 1 part by weight total polymer produced, solvent recovery steps are obviated or minimized with consequent advantage. It is often helpful in obtaining efficient contact between monomers and catalyst and in aiding removal of heat of reaction, to employ larger amounts of solvent, for example, from 5 to 30 parts by weight solvent per 1 part by weight total polymer produced. These inert solvents, which are solvents for the monomers, some of the catalyst components and some of the polymers but are non-solvents for many of the polymers, can also properly be termed inert liquid diluents, or inert organic liquids.

The amount of catalyst required is dependent on the other variables of the polymerization reaction and although amounts as small as 0.01 weight percent based on total weight of monomers charged are sometimes permissible, it is usually desirable to use somewhat larger amounts, such as from 0.1 up to 2 to 5 percent or even considerably higher, say up to 20 percent, depending upon the monomer proportions, the presence or absence of solvent, the temperatures, pressures, and other reaction conditions. When polymerization is effected in the presence of a solvent, the catalyst to solvent weight ratio should be at least about 0.001:1 but much lower values such as 0.001:1 can sometimes be used.

The polymerization can be effected over a wide range of temperatures, again the particular preferred temperatures being chosen in accordance with the pressure, particular catalyst and other reaction variables. Temperatures down to say −40° C. and even lower are suitable, and in many cases it is preferred that the temperature be maintained at below about 35° C. However, higher temperatures appear to be optimum, say from 40° C. to 60° C. Higher temperatures up to 150° C. and higher may sometimes be used.

In most instances, the polymerization is suitably carried out at atmospheric pressure or higher. Sub-atmospheric pressures are permissible. Pressures ranging from atmospheric up to a hundred atmospheres are suitable. While high pressures are not required in order to obtain the reaction, they will have a desirable effect on reaction rate, and in some instances, on polymer quality. The choice of whether or not to use an appreciably elevated pressure will be one of economic and practical considerations taking into account the advantages and disadvantages that will be obtained thereby. In most cases reaction-pressure increases cause increased polymer molecular weight per unit time and will ordinarily be avoided.

The polymer will be recovered from the total reaction mixture by a wide variety of procedures, chosen in accordance with the properties of the particular polymer, the presence or absence of solvent, and the like. It is generally quite desirable to remove as much catalyst from the polymer as possible, and this is conveniently done by contacting the total reaction mixture or the polymer after separation from solvent, etc., with methanolic hydrochloric acid, with an aliphatic alcohol, such as methanol, isobutanol, secondary butanol, or by various other procedures. If the polymer is insoluble in the solvent, it can be separated therefrom by filtration, centrifuging, or other suitable physical separation procedures. If the polymer is soluble as, for example, in higher temperature polymerizations, it is advantageously precipitated by admixture of the solution with a non-solvent, such non-solvent usually being an organic liquid miscible with the solvent but in which the polymer to be recovered is not readily soluble. Of course, any solvent present can also be separated from polymer by evaporation of the solvent, care being taken to avoid subjecting the polymer is too high a temperature in such operation. If a high boiling solvent is used, it is usually desirable to finish any washing of the polymer with a low boiling material, such as one of the lower aliphatic alcohols or hexane, pentane, etc., which aids removal of the higher boiling materials and permits the maximum removal of extraneous material during the final polymer drying step. Such drying step is desirably effected in a vacuum at moderate temperatures, preferably below 100° C. or by vent extrusion at higher temperatures.

By our novel process, block copolymers can be prepared with alternating blocks of linear, isotactic polystyrene and atactic ethylene/propylene copolymer. The block copolymer of linear isotatic polystyrene with atactic ethylene/propylene copolymer is characterized by a broad-end Stifflex Range and improved low temperature characteristics (as compared to ordinary polystyrene) with retention of a considerable measure of the desirable high temperature characteristics of isotactic polystyrene. These block copolymers are further characterized by a high level of insolubility in boiling methyl ethyl ketone. The extracted fraction after a boiling methyl ethyl ketone extraction wherein the remaining polymer contains less than 5% methyl ethyl ketone soluble material is particularly desired for high properties of strength and modulus and excellent low temperature properties.

Although we have illustrated the practice of this invention largely by the use of regular monomer feed cycles, the use of regular cycles was selected herein for uniformity in comparing polymer properties. It will be understood that by the use of automatic feed valves, a schedule of varying monomer feed duration and varying cycle lengths can be programmed to the monomer feed system. Within the scope of this invention are thus included the programmed feed schedules. The present invention can be practiced by any procedure or mechanical technique which permits the catalyst/growing polymer chain entity to be alternately presented with polymerizable substances containing substantial amounts of Monomer A and with polymerizable substance containing substantially no Monomer A within a time limited by the lifetime of the growing chain (wherein Monomer A represents the monomer fed in minor proportion).

In order to illustrate some of the various aspects and advantages of the invention, illustrative examples are given herein. It will, of course, be understood that variations from the particular components, reactants, solvents, catalysts, catalyst proportions, temperatures and the like can be made without departing from the invention.

A 2.5 liter stainless steel reactor was used for conducting the polymerization reactions described herein. The stirrer for this reactor consisted of two turbines driven by an electric motor at 3000 r.p.m. The monomer inlet valves were electrically controlled and adjustable to permit intermittent feeding at a pre-selected timed interval.

Example 1

The reactor was charged with 35 millimoles (mmoles) $TiCl_4$ and 30 ml. dry isooctane followed by the addition of 105 mmoles triethylaluminum, added dropwise in ten minutes at a controlled temperature of 25° C. with the stirrer agitating the catalyst at 500 r.p.m. The catalyst was aged for 30 minutes at 25° C. before feeding any monomer to the reactor. During the catalyst aging interval the reactor was evacuated to the partial pressure of isooctane and then the monomer automatic feed valves were pre-set to feed ethylene monomer to the reactor for an interval of 6 seconds in every 120 second cycle. A 20% solution of dry styrene monomer in isooctane was fed continuously to the polymerization reactor throughout the polymerization period by means of a Lapp pump so that after 3 hours a total quantity of 11.4 grams of styrene monomer had been charged.

After a total reaction time of 3 hours at 45–50° C. it was calculated that monomers had been charged in the proportion of 5% by weight ethylene to 95% by weight styrene. The reaction mixture was quenched by the addition of excess methanol, containing dissolved hydrogen chloride, with rapid agitation. The product copolymer which precipitated was washed with methanol and further purified by refluxing in boiling methanol. This copolymer was then filtered, washed with methanol and dried in a vacuum oven.

The product obtained in this run was compared with a copolpmer of ethylene and styrene prepared using the identical catalyst but with a uniform feed of monomers to the system. Differential thermal analysis indicated that the polymer prepared by the intermittent feed of ethylene exhibits characteristics of isotactic polystyrene blocks along the polymer chains while the product copolymer prepared by uniform feeds does not show the presence of these isotactic polystyrene blocks.

The copolymer prepared in this run was examined for modulus properties by the Clash-Berg test described hereinabove. This sample had a $T_f$ of 41.5° C.; $T_{2000}$ of 123.5° C.; a Stifflex Range of 82.0° C.; additionally this block copolymer exhibited a 25° C. modulus of 215,000 p.s.i. Thus, we obtained a signficant change in product properties by interrupting the isotactic polystyrene chain with blocks of ethylene/styrene copolymer blocks.

Example 2

The thoroughly dried polymerization reactor was charged with 1.31 g. $VCl_3$, 8.34 mmoles, followed by 0.85 ml. $Al(C_2H_5)_3$, 6.25 mmoles, washed into the reactor with 5 ml. dry nonane. This catalyst composition, having a mole ratio of Al to V of 0.75, was aged within the reactor for 1 hour at 25° C., the temperature was then increased to 50° C. and 225 ml. benzene and 225 ml. anhydrous styrene monomer charged. The automatically controlled ethylene feed valve was pre-set to feed ethylene for 5 seconds in every 120 second cycle at a nominal feed rate of 80 grams/hr. After the polymerization reaction had continued for 130 minutes at a temperature of 40–50° C., and 7 g. of ethylene had been fed, the reaction mixture was quenched by the addition of 500 ml. methanol containing hydrogen cholride. The reactants were pourned from the reactor into an excess of methanol with thorough mixing. The polymer was filtered, washed on the filter with acetone and dried in a vacuum oven.

Infrared analysis indicated the presence of isotactic polystyrene in the polymer. A molded test specimen was evaluated for its modulus properties by the Clash-Berg procedures. This sample had a $T_f$ of 85.5° C., a $T_{2000}$ of 99.5° C., a Stifflex Range of 140.0° C. and a 25° modulus of 610,000 p.s.i.

Example 3

The catalyst used in this run was prepared by mixing, in a separate vessel, 1.5908 g. $VCl_3$, 10.11 mmoles, and 1.03 ml. $Al(C_2H_5)_3$, 7.58 mmoles, to give a mole ratio of Al/V of 0.75. These components were mixed for 15 minutes in the absence of air and then washed into the reactor with 100 ml. dry benzene. The reactor was then charged with a solution of 607 ml. styrene and 404 ml. benzene and the charge heated to 50° C. The automatic olefin feed valve was pre-set to feed ethylene into the reactor for an interval of 10 seconds during each 5 minute cycle.

The intermittent ethylene feed was continued with the above cycle for a period of 120 minutes at a polymerization temperature of 49–50° C. Thereafter the reaction was quenched by the addition of 800 ml. methanol containing 1% by volume concentrated hydrochloric acid. The polymer which precipitated was filtered off, thoroughly washed with acetone, reslurried in acetone, and again filtered. After drying in a vacuum oven the sample of the polymer was evaluated for modulus properties. The copolymer produced in this example had a density of 1.062 and the following Clash-Berg modulus properties: $T_f$, 97° C.; $T_{2000}$, 132° C.; Stifflex Range, 35° C.; 25° modulus, 610,000 p.s.i.

Example 4

The procedure and charge used in this run essentially duplicates those of Example 3. The catalyst was premixed in a separate vessel by adding 1.01 ml. $Al(C_2H_5)_3$, 7.45 mmoles, to 1.5628 g. $VCl_3$, 9.93 mmoles, and mixing for 15 minutes. The catalyst was then washed into the polymerization reactor by the use of 100 ml. benzene. The reactor contents were heated to 50° C. and the solution of 596 ml. styrene in 397 ml. benzene charged. The polymerization reactor was operated for 2.0 hours at 50–55° C. during which time ethylene was injected for a period of 10 seconds in every 5-minute cycle.

After polymerization had continued for 2.0 hours, the catalyst was quenched by the addition of 800 ml. methanol containing 1 volume percent concentrated HCl. The polymer which precipitated was filtered and washed on the filter with acetone, re-slurried in acetone and again filtered and washed with acetone before drying in the vacuum oven.

A sample of this resulting polymer was submitted to a series of extraction steps in an attempt to separate any polyblended polymer. No material was removed by extractions using various organic solvents including ethyl ether, n-heptane, and boiling butanol. The product prepared in this run had a density of 1.046 and the following Clash-Berg modulus properties: $T_f$ 92° C.; $T_{2000}$, 120° C., Stifflex Range, 28° C., 25° modulus, 620,000 p.s.i.

Example 5

In this run the polymerization catalyst was prepared by the dropwise addition of 35 ml. aluminum triisobutyl to 5.2 ml. $TiCl_4$ and 6 ml. dry benzene. This catalyst was aged for 10 minutes at room temperature and then 1000 ml. dry styrene monomer added to the reactor. Polymerization of the styrene began immediately as evidenced by heat of reaction as the temperature rose from room temperature to 45° C. within 10 minutes. During this interval isotactic polystyrene was formed rapidly and became visible as a granular slurry in the reactor. One liter of dry benzene was then added and ethylene monomer flow started to produce a block of ethylene/styrene on the growing isotactic polystyrene chain. Within a comparatively short time the polymer slurry became too thick to stir. The catalyst was quenched by the addition of 250 ml. isobutanol. The polymer was filtered from the reaction mixture, washed with excess isobutanol in a Waring Blendor, filtered, washed with acetone, and then slurried in refluxing isobutanol. The polymer was again filtered and washed on the filter with hexane and finally dried in a vacuum oven. A 50 gram sample of this product, injection molded at 240° C. and 1000 p.s.i., exhibited a tensile strength of 10,156 p.s.i. and a 6% tensile elongation at failure with no yield point being observed. The flexural strength of this product was measured at 17,973 p.s.i., and its impact strength was 0.23 ft.-lb./inch notch.

Example 6

In one embodiment of the instant invention block copolymers are prepared containing blocks of isotactic, crystalline polystyrene connected with blocks of an atactic, rubbery copolymer. The atactic block can be a styrene/ethylene copolymer, a styrene/propylene copolymer or a styrene/butene-1 copolymer. However, for certain applications it is desired to prepare a polymer containing blocks of isotactic polystyrene connected to blocks of rubbery ethylene/propylene copolymer. These novel polymers are characterized by having excellent high temperature properties due to the presence of the isotactic styrene block and also good strength, toughness, and impact resistance at low temperatures due to the presence of the atactic ethylene/propylene blocks.

A block copolymer containing blocks of isotactic polystyrene and blocks of rubbery atactic ethylene/propylene copolymer is prepared according to the following procedure. The reactor is charged with 3.75 ml. diethylaluminum chloride, 30.72 mmoles, and 2.0342 g. activated $TiCl_3$, 10.24 mmoles, and 1 liter anhydrous hexane. A typical sample of activated $TiCl_3$ is obtained by treating $TiCl_4$ with aluminum metal as a reducing agent. Analytical data indicate the formula of the aluminum-reduced, activated $TiCl_3$ to be $(TiCl_3)_3AlCl_3$ containing about 1.4% $TiCl_4$. This catalyst mixture is stirred in the hexane diluent for a period of 10 minutes at 50° C. prior to charging monomer to the reactor. The monomer automatic feed valves are pre-set to feed a solution of styrene monomer in anhydrous hexane for 10 minutes in every 30-minute cycle. The styrene feed valve is then automatically closed during a 2-minute interval while a mixture of ethylene and propylene monomers is being fed at about 100 pounds per square inch pressure and then both valves are then closed during an 18-minute wait period. This alternating intermittent feed using a 30-minute cycle is continued for the during of the polymerization run, e.g., 3 hours, during which time the temperature is maintained at 50° C. The actual weight of monomers charged is checked at the end of the run by measuring the weight losses from the monomer feed vessels.

The polymer is then quenched with 200 ml. isobutanol, diluted further with isobutanol and then filtered. If desired, the polymer recovered from this reaction can be subjected to a further extraction step using refluxing diisopropyl ether followed by refluxing heptane to remove trace quantities of polymers not attached to the block copolymer chains. The polymer is then washed on the filter with methanol and dried in a vacuum oven.

By the practice of our invention novel interpolymers of styrene and alpha-olefins of 2 to 6 carbon atoms can be tailored to meet various processing demands. These new copolymers achieve performance levels heretofore beyond reach of either the polybends of polystyrene with polyolefins or the uniform copolymers. While these are, of course, specific uses for polyblends, an added costly processing step is required for their preparation. The copolymers prepared by feeding uniform monomer mixtures have also been adapted to certain specific applications. However, the polymers prepared according to our process are not limited by processing steps, or economical considerations as in the case of the polyblends, nor are they limited to low crystallinity properties that characterize the copolymers prepared by the usual uniform feed techniques. Copolymers prepared by the usual, or common, procedure whereby two monomers are fed to the polymerization zone as a uniform mixture or as a concomitant streams are characteristically atactic in structure and are soluble in many organic solvents.

Since the novel copolymers of our invention have very low extractability with organic solvents, a wide range of applications is available for them. We can use these products as films in wrapping articles, such as foodstuffs where the film must have high strength and good resistance to solvent action. Our novel copolymers can be used in the manufacture of injection moldings, extrusion moldings, and in electrical applications for insulation purposes. In general, we can use the new products of our invention advantageously in place of linear polyethylene or crystalline polypropylene. In many application, such substitution of our new products results in a definitely superior performance.

Example 7

The reactor is charged with 35 millimoles (mmoles) $TiCl_4$ and 30 ml. dry isooctane follows the addition of 105 mmoles triethylaluminum, added dropwise in ten minutes at a controlled temperature of 25° C. with the stirrer agitating the catalyst at 500 r.p.m. The catalyst is aged for 30 minutes at 25° C. before feeding any monomer to the reactor. During the catalyst aging interval, the reactor is evacuated to the partial pressure of isooctane and then the monomer automatic feed valves are preset to feed ethylene monomer to the reactor for an interval of 15 seconds in every 120 second cycle. A 20% solution of dry styrene monomer in isooctane is fed continuously to the polymerization reactor throughout the polymerization period by means of a Lapp pump so that after three hours a total quantity of 11.4 grams of styrene monomer had been charged. The ethylene is added at a rate where after one hour and 10 minutes, the ethylene mole content exceeds the styrene mole content in the reactor. After 1 hour and 50 minutes the ethylene monomer is fed to the reactor for an interval of six seconds in every 120 second cycle.

After a total reaction time of 3 hours at 45-50° C., it is calculated that monomers are charged in the proportion of 12% by weight ethylene to 88% by weight styrene. The reaction mixture is quenched by the addition of excess methanol, containing dissolved hydrogen chloride, with rapid agitation. The product copolymer precipitated is washed with methanol and further purified by refluxing in boiling methanol. This copolymer is then filtered, washed with methanol and dried in a vaccum oven.

The product obtained in this run is compared with a copolymer of ethylene and styrene prepared using the identical catalyst but with a uniform feed of monomers to the system. Differential thermal analysis indicates that the polymer prepared by the intermittent feed of ethylene exhibits characteristics of isotactic polystyrene blocks along the polymer chains while the product copolymer prepared by uniform feeds does not show the presence of these isotactic polystyrene blocks. Furthermore, the polymer prepared by intermittent feed of ethylene exhibits characteristics of blocks of polyethylene along the polymer chains.

While the inevntion has been described with particular reference to certain preferred embodiments thereof, it will be appreciated that variations from the details given herein can be effected without departing from the invention in its broadest aspects.

Having thus described our invention, what we desire to claim and secure by Letters Patent is:

1. Copolymer prepared from ethylene and styrene in which styrene is present in a quantity at least two times the weight of ethylene, characterized by polymer chains consisting of blocks of highly crystallizable styrene homopolymer used in the major proportion alternating with blocks of atactic ethylene/styrene copolymer.

2. A high molecular weight polymer comprising 67 to 98 weight percent combined styrene and from 33 to 2 weight percent combined ethylene, having blocks of polystyrene in the polymer chains alternating with blocks of ethylene/styrene copolymer, characterized by improved low temperature prperties and a broadened Stifflex Range compared with styrene homopolymer.

3. A high molecular weight polymer comprising 67 to 98 weight percent combined styrene and from 33 to 2 weight percent combined ethylene, having blocks of isotactic polystyrene in the polymer chains alternating with blocks of atactic ethylene/styrene copolymer, characterized by improved low temperature properties and a boardened Stiffllex Range compared with styrene homoploymer.

4. The polymer of claim 2 further characterized in that the polymer also includes blocks of polyethylene.

5. A high molecular weight polymer comprising 90 to 98 weight percent styrene polymerizate and 10 to 2 weight percent ethylene polymerizate, prepared by a low pressure polymerization process in the presence of a Ziegler polymerization catalyst adapted for the low pressure polymerization of ethylene and ethylenically unsaturated monomers, by intermittently feeding ethylene to the polymerization zone at a cyclic rate to obtain intervals during which styrene is present in the polymerization zone as substantially the sole monomer available for polymerization, said polymer being characterized by having blocks of crystalline polystyrene atactic ethylene/styrene copolymer, and by having improved physical properties in comparison with conventional polystyrene.

6. A high molecular weigh polymer comprising 67 to 98 weight percent combined styrene and from 33 to 2 weight percent combined ethylene, having blocks of polyethylene in the polymer chains alternating with blocks of ethylene/styrene copolymer, characterized by improved low temperature properties and a broadened Stifflex Range compared with styrene homopolymer.

References Cited

UNITED STATES PATENTS 3,112,301   11/1963   Natta et al. _____ 260—93.55

FOREIGN PATENTS 577,819   10/1959   Belgium.
1,250,798   12/1960   France.
1,081,156   8/1958   Pakistan.

MURRAY TILLMAN, Primary Examiner

JOHN T. GOOLKASIAN, Assistant Examiner

U.S. Cl. X.R.

260—93.5